United States Patent [19]

Mueller et al.

[11] Patent Number: 5,254,531

[45] Date of Patent: Oct. 19, 1993

[54] OLEOPHILIC BASIC AMINE COMPOUNDS AS AN ADDITIVE FOR INVERT DRILLING MUDS

[75] Inventors: Heinz Mueller, Monheim; Claus-Peter Herold, Mettmann; Stephan von Tapavicza, Erkrath, all of Fed. Rep. of Germany

[73] Assignee: Henkel Kommanditgesellschaft auf Aktien, Duesseldorf, Fed. Rep. of Germany

[21] Appl. No.: 825,436

[22] Filed: Jan. 21, 1992

Related U.S. Application Data

[63] Continuation of Ser. No. 478,185, Feb. 9, 1990, abandoned.

[30] Foreign Application Priority Data

Feb. 9, 1989 [DE] Fed. Rep. of Germany ....... 3903785

[51] Int. Cl.$^5$ .......................... C09K 7/02; C09K 7/06
[52] U.S. Cl. ..................... 507/131; 507/130; 507/129; 507/138
[58] Field of Search ............... 507/131, 133, 129, 130

[56] References Cited

U.S. PATENT DOCUMENTS

| | | | |
|---|---|---|---|
| 2,946,746 | 7/1960 | Keller ................... | 252/8.5 |
| 2,966,450 | 8/1961 | Zech et al. ............ | 252/8.511 |
| 2,994,660 | 8/1961 | Reddie et al. ......... | 252/8.511 |
| 2,999,063 | 9/1961 | Hoeppel ................ | 252/8.511 |
| 3,125,517 | 3/1964 | Voda ..................... | 252/8.511 |
| 3,244,638 | 4/1966 | Foley et al. ........... | 252/8.511 X |
| 3,728,277 | 4/1973 | Foley .................... | 252/309 |
| 4,374,737 | 2/1983 | Larson et al. ......... | 252/8.5 P |
| 4,436,636 | 12/1981 | Carnicom .............. | 252/8.5 P |
| 4,481,121 | 11/1984 | Barthel ................. | 252/8.5 M |
| 4,508,628 | 4/1985 | Walker et al. ........ | 252/8.511 |
| 4,631,136 | 12/1986 | Jones, III .............. | 252/8.5 M |

FOREIGN PATENT DOCUMENTS 229912 7/1987 European Pat. Off. .
2158437 11/1985 United Kingdom .

OTHER PUBLICATIONS

Chemical Abstract 20823m (Equiv. to FR 1,441,299).
Chemical Abstract 17106u (Equiv. to FR 1,581,186).
Chemical Abstract 108:153390a (Equiv. to EP 245,157).
New Base Oil Used in Low-Toxicity Oil Muds, Jan. 1985, Soc. of Pet. Eng., pp. 137–142.
New Drilling Fluid Technology-Mineral Oil Mud, Jun. 1984, Soc. of Pet. Eng. pp. 975–981.
Parrish et al., "*Variability of the Acute Toxicity of Drilling Fluids to Mysids 'Mysidopsis bahia'*" Environmental Protection Agency Report No. EPA/600/D-88/212, 1988. NTIS Acquisition No. PB89-120026/XAB. (Abstract only).

*Primary Examiner*—Gary Geist
*Attorney, Agent, or Firm*—Ernest G. Szoke; Wayne C. Jaeschke; Real J. Grandmaison

[57] ABSTRACT

In a first embodiment, the invention relates to the use of basic amine compounds of pronounced oleophilic character and at most limited solubility in water, which are capable of forming salts with carboxylic acids, as an additive for w/o invert drilling muds which contain in the continuous oil phase ester oils and, together with the disperse aqueous phase, emulsifiers, weighting agents, fluid loss additives and, if desired, other additives for protecting the drilling muds against unwanted thickening in use or for improving their flowability. In another embodiment, the invention relates to w/o invert drilling muds which are suitable for the improved offshore development of oil and gas sources and which are characterized by the presence of basic amine compounds of pronounced oleophilic character which are capable of forming salts with carboxylic acids.

25 Claims, No Drawings

OLEOPHILIC BASIC AMINE COMPOUNDS AS AN ADDITIVE FOR INVERT DRILLING MUDS

This application is a continuation of application Ser. No. 07/478,185 filed on Feb. 9, 1990 now abandoned.

BACKGROUND OF THE INVENTION

1. Field of the Invention

This invention relates to new drilling fluids based on ester oils and to invert drilling muds based thereon which combine high ecological compatibility with good stability and performance properties. One important application for the new drilling fluids is in offshore drilling for the development of oil or gas sources, the particular object of the invention in this regard being to provide technically useful drilling fluids of high ecological compatibility. The use of the new drilling fluids is of particular importance in, but is not limited to, the offshore sector. The new drilling fluids may also be used quite generally for land-supported drilling, including for example geothermal drilling, water drilling, geoscientific drilling and mine drilling. In this case, too, the ester-based drilling fluids selected in accordance with the invention basically simplify ecotoxic problems to a considerable extent.

2. Discussion of Related Art

It is known that liquid drilling fluids for sinking bores in rock and bringing up the rock cuttings are slightly thickened, water-based or oil-based fluid systems. Oil-based systems are being increasingly used in practice, particularly in offshore drilling or in the penetration of water-sensitive layers.

Oil-based drilling fluids are generally used in the form of so-called invert emulsion muds which consist of a three-phase system, namely: oil, water and finely divided solids. The emulsions in question are of the water-in-oil (w/o) emulsion type, i.e. the aqueous phase is present in the continuous oil phase in heterogeneous fine dispersion. There is a whole range of additives, including in particular emulsifiers and emulsifier systems, weighting agents, fluid loss additives, alkali reserves, viscosity regulators and the like, for stabilizing the system as a whole and for establishing the desired performance properties. Full particulars can be found, for example, in the Article by P. A Boyd et al entitled "New Base Oil Used in Low-Toxicity Oil Muds" in Journal of Petroleum Technology, 1985, 137 to 142 and in the Article by R.B. Bennet entitled "New Drilling Fluid Technology—Mineral Oil Mud" in Journal of Petroleum Technology, 1984, 975 to 981 and the literature cited therein.

Oil-based drilling muds were originally made from diesel oil fractions containing aromatic constituents. For the purposes of detoxification and reducing the ecological problems thus created, it was then proposed to use hydrocarbon fractions substantially free from aromatic compounds, now also known as "nonpolluting oils", as the continuous oil phase, cf. the literature cited above. Although certain advances were achieved in this way through elimination of the aromatic compounds, a further reduction in the environmental problems caused by drilling fluids of the type in question here seems to be urgently required. This applies in particular to the sinking of offshore wells for the development of oil and gas sources because the marine ecosystem is particularly sensitive to the introduction of toxic and non-readily degradable substances.

The relevant technology has for some time recognized the significance of ester-based oil phases for solving these problems. Thus, U.S. Pat. Nos. 4,374,737 and 4,481,121 describe oil-based drilling muds in which nonpolluting oils are said to be used. Non-aromatic mineral oil fractions and vegetable oils of the peanut oil, soybean oil, linseed oil, corn oil and rice oil type, and even oils of animal origin, such as whale oil, are mentioned alongside one another as nonpolluting oils of equivalent rank. The ester oils of vegetable and animal origin mentioned here are all triglycerides of natural fatty acids which are known to be environmentally safe and which, ecologically, are distinctly superior to hydrocarbon fractions, even where they have been dearomaticized.

Interestingly, however, not one of the Examples in the U.S. patents cited above mentions the use of such natural ester oils in invert drilling muds of the type in question here. Mineral oil fractions are used throughout as the continuous oil phase.

The investigations on which the present invention is based have shown that the use of readily degradable oils of vegetable or animal origin, which was considered in the prior art, is not feasible for practical reasons. The rheologic properties of such oil phases cannot be controlled for the wide temperature range required in practice of 0° to 5° C. on the one hand, and up to 250° C. and higher on the other hand.

Ester oils of the type in question here do not in fact show the same in-use behavior as the pure hydrocarbon-based mineral oil fractions used hitherto. In practice, ester oils irrespective of their constitution undergo partial hydrolysis precisely in the w/o invert drilling muds, resulting in the formation of free carboxylic acids. These free carboxylic acids in turn react with the alkaline constituents always present in the drilling mud systems of the type in question here, for example with the alkali reserve used for corrosion prevention, to form the corresponding salts. However, salts of highly hydrophilic bases and the acids having carbon chain lengths of about $C_{12}$ to $C_{24}$ predominantly encountered in oils of natural origin are known to be compounds having comparatively high HLB values which, in particular, lead to the formation and stabilization of o/w emulsions. Use is made of this on a very wide scale in the field of detergents and cleaning preparations. However, the formation of even limited quantities of such o/w emulsifier systems must interfere with the w/o emulsions required for solving the problem addressed by the invention and, hence, must lead to problems.

Earlier applications U.S. Ser. No. 07/452,457 filed Dec. 18, 1989 titled "The use of selected ester oils in drilling muds (I)" now abandoned and U.S. Ser. No. 07/452,988 filed Dec. 19, 1989 titled "The use of selected ester oils in drilling muds (II)") now abandoned relate to the use of ester oils based on selected monocarboxylic acids or monocarboxylic acid mixtures and associated monofunctional alcohols. The earlier applications show that it is possible with the disclosed esters or ester mixtures of monofunctional reactants not only to establish satisfactory rheological properties in the fresh drilling mud, but also to work with selected known alkali reserves in the drilling mud and thus to prevent unwanted corrosion. According to the teaching of these earlier applications, it is crucial so far as the alkali reserve is concerned that no hydrophilic bases, such as alkali hydroxide and/or diethanolamine, are present. The alkali reserve is formed by the addition of lime (calcium hydroxide) or by the presence of zinc oxide or comparable zinc compounds. However, an additional limitation is necessary in this regard also. If unwanted thickening of the oil-based invert drilling mud is to be prevented in practice, the quantity of alkalizing additive and, in particular, the quantity of lime have to be limited. According to the disclosure of the earlier applications mentioned, the maximum addition envisaged is put at about 2 lb/bbl (barrel) oil mud.

By contrast, the teaching of the present invention is based on deeper considerations and realizations hitherto unknown in the field of the invert drilling muds in question here with their continuous oil phase. The teaching according to the invention takes into account the fact that, in practice, drilling muds of the type in question containing ester oils undergo limited partial hydrolysis so that free carboxylic acids are unavoidably formed to an increasing extent as a hydrolysis product and, sooner or later, reach a critical or at least endangered state of aging reflected in unwanted thickening of the drilling mud. The teaching according to the invention is based on the concept of using an additional additive in invert drilling muds of the type in question here which is capable of keeping the desired rheological properties of the drilling mud within the required limits, even when increasingly more and more or even excessive quantities of free carboxylic acids are formed by partial ester hydrolysis. In this regard, the teaching of the invention seeks not only to trap the free carboxylic acids formed in a harmless form, but also to convert them, if desired, into valuable components having stabilizing or emulsifying properties for the system as a whole.

3. Description of the Invention

Other than in the operating examples, or where otherwise indicated, all numbers expressing quantities of ingredients or reaction conditions used herein are to be understood as modified in all instances by the term "about".

In a first embodiment, therefore, the present invention relates to the use of basic amine compounds of pronounced oleophilic character and at most limited solubility in water, which are capable of forming salts with carboxylic acids, as an additive for w/o invert drilling muds which contain in the continuous oil phase ester oils and, together with the disperse aqueous phase, emulsifiers, weighting agents, fluid loss additives and, if desired, other additives for protecting the drilling muds against unwanted thickening in use or for improving their flow properties.

In another embodiment, the invention relates to w/o invert drilling muds which are suitable for the offshore development of oil and gas sources and, in a continuous oil phase containing ester oils, contain a disperse aqueous phase together with emulsifiers, weighting agents, fluid loss additives and, if desired, other typical additives. In this embodiment, the invention is characterized in that the drilling muds contain as an additional additive basic amine compounds of pronounced oleophilic character and at most limited solubility in water which are capable of forming salts with carboxylic acids. The addition of the additives according to the invention affords the drilling muds protection against unwanted thickening in use and, overall, is suitable for improving their flow properties.

Finally, in another embodiment, the invention relates to additive mixtures which are suitable for the stated purpose in drilling muds containing ester oils and which contain the basic amine compounds of pronounced oleophilic character and at most limited solubility in water, which are capable of forming salts with carboxylic acids, in a solvent miscible with the oil phase. Preferred solvents are so-called nonpolluting oils, particular significance again being attributed in this regard to the ester oils. In mixtures of the type just mentioned, the anti-aging agents based on the oleophilic basic amine compounds are best present in concentrations of at least about 20% by weight and preferably in concentrations of at least about 50% by weight.

The essence of the teaching according to the invention in all its embodiments is the finding that, where the anti-aging agents according to the invention based on oleophilic basic amine compounds are used, the carboxylic acids unavoidably formed in practice through partial hydrolysis of the ester oils are trapped without the rheological properties of the invert mud being adversely affected. By selecting suitable amine compounds, it is even possible to form valuable stabilizing or emulsifying mixture constituents in situ through the salt formation which now occurs. The oleophilic basic amine compounds may be added to the drilling mud systems from the outset or may be added to them during use. It has been found that it is even possible by adding or using the basic oleophilic amine compounds according to the invention to regenerate aged and undesirably thickened drilling muds of the type in question here to such an extent that their rheology is reduced to the range required for pumpability and free flow, even at low temperatures.

The use of the additives according to the invention has revealed another important simplification in the composition of w/o drilling muds, namely: the alkalization of the drilling mud required for corrosion prevention and, in particular, the creation of an adequate alkali reserve, particularly against inrushes of acidic gases, such as $CO_2$ and/or $H_2S$, becomes unproblematical. The basic amine compounds of pronounced oleophilic character proposed as additives in accordance with the invention spontaneously form a basicity buffer which may be used as an alkali reserve. Of greater importance is the surprising observation that the use of conventional alkali reserves and, in particular, the use of lime, which is particularly inexpensive, becomes at least largely unproblematical if the anti-aging additives according to the invention are simultaneously present in the drilling mud. In general, the above-mentioned limit of approximately 2 lb/bbl (lime/oil mud) for drilling muds based on ester oils, which is disclosed in the earlier applications cited above, may be safely exceeded providing the basic amine compounds of pronounced oleophilic character according to the invention are present in the oil mud. Even if unwanted thickening has occurred through the use of conventional, highly hydrophilic alkali reserves, it may be eliminated by incorporation of the additive component according to the invention in the system as a whole.

The basic amine compounds of pronounced oleophilic character selected in accordance with the invention are discussed in more detail in the following.

Basic amine compounds containing relatively short carbon chains are known to be highly soluble in water and, optionally, miscible with water in any quantitative ratios. By contrast, the amine compounds selected in accordance with the invention are characterized by distinctly limited solubility in water with simultaneous development of their oleophilic character. Their solubility in water at room temperature is generally less than about 10% by weight and, in the preferred embodiment, does not exceed a value of approximately 5% by weight. Of importance above all are oleophilic amine compounds which have very small limits for their solubility in water at room temperature. An important limit is at about 1% by weight and preferably at less than about 0.1% by weight. Particularly important basic amines for the purposes of the invention may be regarded as substantially insoluble in water.

Oleophilic amines of the described type may generally be used providing they are capable of forming salts with the carboxylic acids released during the ester hydrolysis and, preferably, are soluble in the oil phase. In the context of the object according to the invention of causing minimal toxic environmental pollution, preference is attributed to ecologically comparatively safe representatives of this wide range of basically suitable amine compounds. From these considerations, it follows that aromatic amines are generally less suitable so that another preferred embodiment of the invention is characterized by the use of oleophilic amine compounds which are at least substantially free from aromatic constituents. Suitable compounds for carrying out the teaching according to the invention may generally be assigned to the groups of aliphatic, cycloaliphatic and-/or heterocyclic amines. The particular representatives may contain one or even more N groups capable of forming salts with carboxylic acids. Amine compounds of the described type may be nitrogen-containing saturated hydrocarbon compounds, although amine hydrocarbons containing one or more olefinically unsaturated groups in at least one of their hydrocarbon members are also suitable.

There is considerable freedom of choice in regard to the particular constitution of the amine components used in accordance with the invention. Economic considerations largely dictate the choice of the particular components. In general, particularly suitable representatives may be assigned to the following classes:

Primary, secondary or tertiary amines at least substantially insoluble in water, corresponding aminoamides or heterocycles containing nitrogen as a ring constituent. Amine bases containing at least one long-chain hydrocarbon radical preferably having approximately 8 to 36 carbon atoms and, more preferably, approximately 10 to 24 carbon atoms in the molecule can be particularly suitable. These hydrocarbon radicals may be directly attached to the nitrogen atom. However, they may also be attached to an N-containing part of the molecule through a functional group, as in the case of the aminoamides for example. In this case, it is important to ensure that at least one basic N atom capable of forming a salt with the carboxylic acids released by ester hydrolysis is present in the molecule as a whole. Typical examples of the various classes mentioned here are discussed in more detail in the following.

A first group comprises primary, secondary and tertiary amines containing one or more N atoms, the ratio of hydrocarbon groups to amine groups in the particular compound being selected so that the conditions stated above with regard to limited solubility in water and pronounced oleophilic character are fulfilled. In simple unsubstituted compounds of the type in question, the C:N ratio is at least about 5 or, better yet, 6, but preferably higher. In amines of the type in question readily obtainable on an industrial scale, 1 or 2 comparatively long-chain hydrocarbon radicals and, for the rest, methyl groups are often present at the aminonitrogen.

Typical examples of the type in question here contain 1 nitrogen atom per molecule. Comparable compounds derived from polyfunctional amines, particularly lower diamines, for example ethylenediamine or propylenediamine, are also readily obtainable on an industrial scale. Lower polyamines of the type in question here are highly soluble in water. However, if one or more long-chain hydrocarbon radicals of the above-mentioned type are introduced into their molecule, suitable additives according to the invention are formed providing at least one nitrogen atom is capable of salt formation with the carboxylic acids. Suitable representatives of this type are, for example, compounds corresponding to the general formula $R-NH-(CH_2)_n-NH_2$ where R is, for example, a hydrocarbon radical containing approximately 8 to 22 C atoms and in is a low number of up to about 6 and, more preferably, from 2 to 4.

Primary and possibly even secondary amines in which parts of the molecule are of pronounced oleophilic character may be suitable for the purposes of the invention even when oligo-alkoxide groups are introduced at the NH groups present by alkoxylation with, for example, ethylene oxide (EO) or propylene oxide (PO) or higher homologs, for example butylene oxide. For example, long-chain primary or secondary amines are sufficiently oleophilic, even where up to about 8 to 10 EO or PO groups are introduced, so that they may be considered for use in accordance with the invention.

Industrially readily obtainable amine compounds for use in accordance with the invention are derived from the epoxidation of olefinically unsaturated hydrocarbon compounds with subsequent introduction of the N function by addition to the epoxide group. The reaction of the epoxidized intermediate components with primary or secondary amines to form the corresponding alkanolamines is of particular significance in this regard. Polyamines, particularly lower polyamines of the corresponding alkylenediamine type, are also suitable for opening of the epoxide ring.

Another important class of the oleophilic amine compounds for the purposes of the invention are aminoamides derived from preferably long-chain carboxylic acids and polyfunctional, particularly lower, amines of the above-mentioned type. The key factor in their case is that at least one of the amino functions is not bound in amide form, but remains intact as a potentially salt-forming basic amino group. Both in this case and in all the cases dicussed in the foregoing, the basic amino groups, where they are formed as secondary or tertiary amino groups, may contain hydroxyalkyl substituents and, in particular, lower hydroxyalkyl substituents containing up to 5 and preferably up to 3 C atoms in addition to the oleophilic part of the molecule. Suitable N-basic starting components for the preparation of such adducts containing long-chain oleophilic molecule constituents are monoethanolamine or diethanolamine. Thus, in one preferred embodiment, suitable additives according to the invention are reaction products from the epoxidation of long-chain olefins containing, for example, 8 to 36 and, in particular, approximately 10 to 18 C atoms and mono- or diethanolamine. α-Olefins of the type mentioned may be particularly important as a starting material for the epoxidation and the subsequent reaction to the secondary or tertiary amine containing hydroxyalkyl groups at the N atom.

An important class of heterocyclic additives for regulating the flow properties of the drilling muds according to the invention are the imidazoline compounds. Other important members of this heterocylic group are alkylpyridines.

The additives based on oleophilic basic amine compounds according to the invention are preferably added to the drilling muds in quantities of no more than about 10 lb/bbl and, more preferably, in quantities of no more than 5 lb/bbl. The quantity used may be determined inter alia by the type of application envisaged in practice. Many variants are possible in this regard and may even be combined with one another.

In a first embodiment, the flow-control additive is added to the drilling mud in a considerable quantity from the outset and, in this case, may perform a dual function. On the one hand, it forms the alkali reserve of the drilling mud to trap any inrushes of acidic constituents, such as $CO_2$ and/or $H_2S$; on the other hand, the basic amine compound optionally present in a large excess takes up the carboxylic acid components formed by hydrolysis as they are being formed and converts them into the corresponding oil-soluble salts. In the opposite extreme case, the invention initially operates with the drilling mud based on ester oil without the additives according to the invention, for example in accordance with the teaching of the earlier applications cited above (U.S. Ser. No. 07/452,457 and 07/452,988). If aging of the drilling mud occurs, as reflected in an incipient increase in viscosity, the flow-control additive according to the invention is added to the drilling mud continuously or in portions. This may readily be done during drilling. It is clear that any combinations between these two extremes are possible for the introduction of the additive according to the invention before and during the drilling operation or the use of the drilling mud. Providing suitable amine compounds forming effective emulsifier systems are used, it is even possible to save emulsifier in the oil to be subsequently added and, instead, to use the emulsifying amine salts formed in situ to stabilize the system as a whole.

The amine compounds may be added to the invert drilling muds directly or indirectly. Thus, they may be incorporated beforehand in the oil phase containing ester oil or are added to the overall system as such. In one particularly suitable embodiment, additive concentrates are prepared and may then be added to the drilling mud, particularly during drilling. The products in question are solutions of the oleophilic amine compounds in suitable solvents with preferred concentrations of the additive of at least about 20% by weight, but preferably of at least about 50% by weight. Suitable solvents are nonpolluting oils which may be homogeneously incorporated in the drilling mud. Ester oils, for example of the type mentioned in the two earlier applications cited, and described herein below, are particularly suitable for this purpose.

As already mentioned, it is an important advantage of the invention that the use of the additives according to the invention to regulate the flowability and pumpability of the drilling muds now opens up the possibility, even in the case of oil phases based on ester oil, of using conventional alkali reserves in the quantities hitherto typically used for drilling muds based on mineral oils as the oil phase. For example, lime may be used in quantities of up to 5 lb/bbl with no risk of lasting damage to the drilling mud in operation. The same applies to the zinc compounds mentioned in the earlier applications, such as zinc oxide, zinc complex compounds and the like. Surprisingly, however, it is even possible to use the strongly hydrophilic bases hitherto typically used for the alkalization of drilling muds. If the alkali reserve is formed as described by conventional means, for example by the use of considerable quantities of lime, the quantity of amine-based additives selected in accordance with the invention may be reduced into the range required during the process as a result of ester saponification. In one important embodiment, only a slight excess of the oleophilic amine base is used and the amount consumed by salt formation is added continuously or in portions during the drilling operation. In this embodiment, the quantity of amine base added may be, for example, in the range from 0.1 to 2 lb/bbl (amine base/drilling mud) or even smaller.

Particularly suitable ester oils are esters of monofunctional carboxylic acids or carboxylic acid mixtures and monofunctional alcohols, more especially the esters described in detail in the earlier applications cited above. To complete the disclosure of the invention, essential characteristics of those ester or ester mixtures are briefly summarized in the following.

In a first embodiment, esters which are flowable and pumpable at 0° to 5° C. of monohydric $C_{2-12}$ and, more particularly, $C_{4-12}$ alcohols and aliphatic saturated $C_{-16}$ monocarboxylic acids or mixtures thereof with at most substantially equal quantities of other monocarboxylic acids are used as the oil phase. Preferred ester oils are those of which at least about 60% by weight, based on carboxylic acid mixture, are esters of aliphatic $C_{12-14}$ monocarboxylic acids and optionally, for the remainder, small quantities of relatively short-chain aliphatic or relatively long-chain, in that case more especially mono- or polyolefinically unsaturated monocarboxylic acids. Preferred esters are those which have a Brookfield (RVT) viscosity at 0° to 5° C. of no more than 50 mPa.s, preferably of no more than 40 mPa.s and, more preferably, of at most 30 mPa.s. The esters used in the drilling mud have solidification values (pour point and setting point) below −10° C. and preferably below −15° C. and, in particular, flash points above 100° C. and preferably above 150° C. The carboxylic acids present in the ester or ester mixture are at least predominantly linear and, preferably, of vegetable origin. They may be derived from corresponding triglycerides, such as coconut oil, palm kernel oil or babassu oil. The alcohol radicals of the esters used are derived in particular from linear or branched saturated alcohols preferably containing 4 to 10 C atoms. These alcohol components may also be of vegetable or animal origin, having been obtained by reductive hydrogenation of corresponding carboxylic acid esters.

The other class of particularly suitable ester oils is derived from mono- or polyolefinically unsaturated $C_{16-24}$ monocarboxylic acids or mixtures thereof with small quantities of other, in particular, saturated monocarboxylic acids and monofunctional $C_{2-12}$ alcohols These ester oils are also flowable and pumpable at temperatures in the range from 0° to 5° C. Particularly suitable esters of this type are those of which more than 70% by weight, preferably more than 80% by weight and, in particular, more than 90% by weight are derived from olefinically unsaturated $C_{16-24}$ carboxylic acids.

In their case, too, the solidification values (pour point and setting point) are below −10° C. and preferably below −15° C., while the flash points are above 100° C. and preferably above 160° C. The esters used in the drilling mud have a Brookfield (RVT) viscosity at 0° to 5° C. of no more than 55 mPa.s and preferably of no more than 45 mPa.s.

Ester oils of the type herein may be divided into two sub-classes. In the first sub-class, no more than 35% by weight of the unsaturated $C_{16-24}$ monocarboxylic acid residues in the ester are derived from di- and polyolefinically unsaturated acids, preferably at least about 60% by weight of the acid residues being mono-olefinically unsaturated. In the second sub-class, more than 45% by weight and preferably more than 55% by weight of the $C_{16-24}$ monocarboxylic acids in the ester mixture are derived from di- or polyolefinically unsaturated acids. Saturated $C_{16-18}$ carboxylic acids in the ester mixture best make up no more than about 20% by weight and, in particular, no more than about 10% by weight. However, saturated carboxylic acids preferably have relatively low C chain lengths of the acid residues. In this case, too, the carboxylic acid residues present are at least predominantly linear and are of preferably vegetable or animal origin. Vegetable starting materials are, for example, palm oil, peanut oil, castor oil and, in particular, rapeseed oil. Carboxylic acids of animal origin are, in particular, corresponding mixtures of fish oils, such as herring oil.

Invert drilling muds of the type herein typically contain the finely disperse phase, together with the continuous oil phase, in quantities of from about 5 to 45% by weight and preferably in quantities of from about 5 to 25 % by weight. The range from about 10 to 25% by weight of disperse aqueous phase can be particularly important.

The following rheologic data apply to the rheology of preferred invert drilling muds according to the invention: plastic viscosity (PV) in the range from about 10 to 60 mPa.s and preferably in the range from about 15 to 40 mPa.s, yield point (YP) in the range from about 5 to 40 lb/100 ft$^2$ and preferably in the range from about 10 to 25 lb/100 ft$^2$, as measured at 50° C. Full information on the determination of these parameters, on the measurement techniques used and on the otherwise standard composition of the invert oil muds described herein can be found in the prior art cited above and, for example, in "Manual of Drilling Fluids Technology" published by NL-Baroid, London, GB, cf. in particular the Chapter entitled "Mud Testing—Tools and Techniques" and "Oil Mud Technology", which is freely available to interested experts. In the interests of fullness of disclosure, the following summary observations may be made:

Emulsifiers suitable for use in practice are systems which are capable of forming the required w/o emulsions. Selected oleophilic fatty acid salts, for example those based on amidoamine compounds, are particularly suitable, examples being described in the previously cited U.S. Pat. No. 4,374,737 and the literature cited therein. One particularly suitable type of emulsifier is the product marketed under the name of "EZ-mul ®" by NL Baroid, London.

Emulsifiers of the type in question here are marketed in the form of concentrates and may be used, for example, in quantities of from about 2.5 to 5% by weight and more especially in quantities of from about 3 to 4% by weight, based in each case on the ester oil phase.

In practice, hydrophobicized lignite in particular is used as a fluid-loss additive and, hence, in particular for forming an impervious coating in the form of a substantially water-impermeable film over the walls of the well. Suitable quantities are, for example, in the range from about 15 to 20 lb/bbl or in the range from about 5 to 7% by weight, based on the ester oil phase.

In drilling muds of the type herein, the thickener normally used to create viscosity is a cationically modified, finely divided bentonite which may be used in particular in quantities of from about 8 to 10 lb/bbl or in the range from about 2 to 4% by weight, based on the ester oil phase. The weighting agent normally used in practice to establish the necessary pressure equalization is baryta which is added in quantities adapted to the particular conditions to be expected in the well. For example, it is possible by addition of baryta to increase the specific gravity of the drilling mud to values of up to about 2.5 and preferably in the range from about 1.3 to 1.6.

In invert drilling muds of the type herein, the disperse aqueous phase is charged with soluble salts, generally calcium chloride or potassium chloride, the aqueous phase preferably being saturated with the soluble salt at room temperature.

The emulsifiers or emulsifier systems mentioned above may also be used to improve the oil wettability of the inorganic weighting materials. In addition to the aminoamides already mentioned, alkyl benzenesulfonates and imidazoline compounds are mentioned as further examples. Additional information on the relevant prior art can be found in the following literature references: GB 2,158,437, EP 229 912 and German 32 47 123.

In addition to the advantages already mentioned, the drilling fluids based in accordance with the invention on the co-use of ester oils of the described type are also distinguished by distinctly improved lubricity. This is particularly important when the path of the drill pipe and hence the well deviate from the vertical during drilling, for example at considerable depths. In such cases, the rotating drill pipe readily comes into contact with the well wall and embeds itself therein. Ester oils of the type used as oil phase in accordance with the invention have a distinctly better lubricating effect than the mineral oils hitherto used, which is an important advantage of the teaching according to the invention.

EXAMPLES

In the following Examples, two typical ester oils are used as the oil phase of the invert drilling muds. In both cases, the ester oils in question are monocarboxylic acids/monoalcohol esters which may be characterized as follows: Examples 1 to 3: distilled n-hexyl lauric acid ester having the following characteristic data:

flash point above 165° C., pour point above −5° C., density (20° C.) 0.857 to 0.861, iodine value and acid value below 1, water content below 0.3%, and the following viscosity data (Brookfield mPa.s) in the low-temperature range:

5° C., 22.5 to 25.5; + 2° C., 15 to 18; + 5° C., 15 to 18; + 10° C., approx. 15; 20° C., 12 to 14.

Examples 4 to 10: isobutyl rapeseed oil ester based on a mixture of predominantly unsaturated linear carboxylic acids corresponding to substantially the following distribution: 60% oleic acid, 20% linoleic acid, 9 to 10% linolenic acid, olefinically unsaturated $C_{20-22}$ monocarboxylic acids approx. 4%, remainder saturated monocarboxylic acids predominantly in the $C_{16-18}$ range.

The rapeseed oil ester used has the following characteristic data: density (20° C.) 0.872 g/cm$^3$; pour point below −15° C.; flash point (DIN 51584) above 180° C.; acid value (DGF-C-V 2) 1.2; viscosity at 0° C. 32 mPa.s, viscosity at 5° C. 24 mPa.s.

An invert drilling mud is conventionally produced using the following constituents:

| | | |
|---|---|---|
| 230 ml | ester oil | |
| 26 ml | water | |
| 6 g | organophilic bentonite (Geltone II ®, a product of NL Baroid) | |
| 12 g | organophilic lignite (Duratone ®, a product of NL Baroid) | |
| x g | lime | |
| 6 g | w/o emulsifier (EZ-mul NT ®, a product of NL Baroid) | |
| 346 g | baryta | |
| 9.2 g | $CaCl_2 \times 2 H_2O$ | |
| y g | oleophilic basic amine | |

The plastic viscosity (PV), the yield point (YP) and the gel strength after 10 secs. and 10 mins. of the particular invert drilling mud tested are first determined by measuring the viscosity of the unaged material at 50° C.

The invert drilling mud is then stored in an autoclave (so-called roller oven) for 16 hours at 125° C. to investigate the effect of temperature on emulsion stability. The viscosities are then remeasured at 50° C.

EXAMPLE 1

The n-hexyl ester of lauric acid was used as the oil phase. Lime was added in a quantity of 2 g to the above starting formulation. There was no addition of a basic amine of pronounced oleophilic character corresponding to the definition according to the invention. The following values were determined on the material before and after aging:

| | Unaged material | Aged material |
|---|---|---|
| Plastic viscosity (PV) | 19 | 50 |
| Yield point (YP) | 8 | 36 |
| Gel strength (lb/100 ft$^2$) | | |
| 10 secs. | 6 | 41 |
| 10 mins. | 7 | 48 |

The drilling mud undergoes considerable thickening after aging for only 16 hours at 125.C. The quantity of lime used is above the threshold value of 2 lb/bbl.

EXAMPLE 2

0.5 g of a basic amine of pronounced oleophilic character was added to the invert drilling mud of Example 1. The reaction product of an epoxidized $C_{12-14}$ α-olefin and diethanolamine (Applicants' "Araphen G2D") was used as the basic amine.

The rheological data of the material before and after aging are as follows:

| | Unaged material | Aged material |
|---|---|---|
| Plastic viscosity (PV) | 19 | 36 |
| Yield point (YP) | 9 | 18 |
| Gel strength (lb/100 ft$^2$) | | |
| 10 secs. | 5 | 20 |
| 10 mins. | 7 | 33 |

EXAMPLE 3

The same oleophilic basic amine as in Example 2 ("Araphen G2D") was added to the invert drilling mud in a quantity of 1 g. The material shows the following values before and after aging:

| | Unaged material | Aged material |
|---|---|---|
| Plastic viscosity (PV) | 20 | 21 |
| Yield point (YP) | 8 | 6 |
| Gel strength (lb/100 ft$^2$) | | |
| 10 secs. | 5 | 4 |
| 10 mins. | 6 | 5 |

Comparison of Examples 1 to 3 with one another clearly shows the stabilizing effect of the addition of an oleophilic basic amine corresponding to the definition according to the invention.

EXAMPLE 4

In this Example and in Examples 5 to 9, the isobutyl rapeseed oil ester defined above was used as the continuous oil phase.

In Example 4, no lime was added, although 2 g of the oleophilic basic amine ("Araphen G2D") defined above was incorporated in the drilling mud. The material shows the following values before and after aging:

| | Unaged material | Aged material |
|---|---|---|
| Plastic viscosity (PV) | 28 | 28 |
| Yield point (YP) | 11 | 4 |
| Gel strength (lb/100 ft$^2$) | | |
| 10 secs. | 15 | 6 |
| 10 mins. | 13 | 9 |

EXAMPLE 5

Example 4 was repeated, except that stearyl amine was used in a quantity of 2 g as the oleophilic basic amine. The material shows the following values before and after aging:

| | Unaged material | Aged material |
|---|---|---|
| Plastic viscosity (PV) | 27 | 27 |
| Yield point (YP) | 16 | 5 |
| Gel strength (lb/100 ft$^2$) | | |
| 10 secs. | 12 | 5 |
| 10 mins. | 13 | 7 |

EXAMPLE 6

For comparison, 1 g lime was added to the isobutyl rapeseed oil ester in the absence of oleophilic basic amine compounds. The quantity of 1 g used in the starting formulation is below the threshold value of 2 lb/bbl which, for the formulation used here, corresponds to an addition of approximately 1.35 g lime.

The rheological data of the material before and after aging are as follows:

| | Unaged material | Aged material |
|---|---|---|
| Plastic viscosity (PV) | 27 | 28 |
| Yield point (YP) | 10 | 18 |
| Gel strength (lb/100 ft$^2$) | | |
| 10 secs. | 6 | 6 |

-continued

|         | Unaged material | Aged material |
|---------|-----------------|---------------|
| 10 mins. | 8 | 8 |

EXAMPLE 7

2 g of the oleophilic basic amine compound "Araphen G2D" were added to the formulation of Example 6. The drilling mud shows the following rheological values:

|  | Unaged material | Aged material |
|---|---|---|
| Plastic viscosity (PV) | 30 | 32 |
| Yield point (YP) | 10 | 11 |
| Gel strength (lb/100 ft$^2$) | | |
| 10 secs. | 8 | 7 |
| 10 mins. | 9 | 7 |

EXAMPLE 8

An isobutyl rapeseed oil ester was again investigated with addition of 2 g lime to the starting formulation, but without the addition of the oleophilic basic amine. The rheological data are as follows:

|  | Unaged material | Aged material |
|---|---|---|
| Plastic viscosity (PV) | 27 | 84 |
| Yield point (YP) | 12 | 22 |
| Gel strength (lb/100 ft$^2$) | | |
| 10 secs. | 7 | 21 |
| 10 mins. | 8 | 51 |

Comparison of Example 8 with Example 6 shows the considerable thickening effect which is initiated during aging when the quantity of lime is increased beyond the threshold value of approximately 2 lb/bbl.

EXAMPLE 9

2 g "Araphen G2D" was added to the invert drilling mud of Example 8. The material shows the following rheological values before and after aging:

|  | Unaged material | Aged material |
|---|---|---|
| Plastic viscosity (PV) | 28 | 32 |
| Yield point (YP) | 15 | 12 |
| Gel strength (lb/100 ft$^2$) | | |
| 10 secs. | 8 | 6 |
| 10 mins. | 8 | 6 |

Comparison with the rheological data of Example 8 shows the effect of the oleophilic basic amine compound added in accordance with the invention.

EXAMPLE 10

2 g diethylenetriamine, i.e. a strongly hydrophilic base, was added to the invert drilling mud of Example 8. The rheological data of the material was determined before aging.

This invert drilling mud was then aged for 16 hours at 125° C. in the same Way as described above. It was found that the mud thickened to such an extent that the rheological data could not be measured.

2 g of the oleophilic basic amine compound "Araphen G2D" were added to the thickened mass and the resulting mixture re-aged for 16 hours at 125° C. in a roller oven. The thickened mass was liquefied so that its rheological data could now be measured.

Overall, the following values were determined:

|  | Unaged material | Aged 1st aging | 2nd aging after addition of the amine compound |
|---|---|---|---|
| Plastic viscosity (PV) | 31 | cannot be measured | 45 |
| Yield point (YP) | 24 | | 25 |
| Gel strength | | | |
| 10 secs. | 16 | | 114 |
| 10 mins. | 23 | | 120 |

What is claimed is:

1. A process for improving the flowability of a water-in-oil invert drilling mud and for protecting said mud against unwanted thickening during use, said mud containing an ester oil in a continuous oil phase together with a disperse aqueous phase, an emulsifier, weighting agent, and fluid loss additive, comprising adding to said mud a basic amine compound having an oleophilic character and a limited solubility in water, and forming an oil-soluble salt with said amine compound and a carboxylic acid formed by hydrolysis of said ester oil.

2. A process as in claim 1 including adding to said mud a substance other than said basic amine to provide an alkali reserve to said mud.

3. A process as in claim 2 wherein said substance comprises lime.

4. A process as in claim 1 wherein said amine compound comprises an oleophilic amine compound which is substantially free from aromatic constituents.

5. A process as in claim 1 wherein said amine compound is selected from an olefinically unsaturated aliphatic, cycloaliphatic and heterocyclic oleophilic basic amine containing one or more N groups.

6. A process as in claim 1 wherein said amine compound has a solubility in water at room temperature of less than about 5% by weight.

7. A process as in claim 1 wherein said amine compound is selected from the group consisting of a substantially water-insoluble primary, secondary and tertiary amine, a basic amine compound containing at least one long-chain hydrocarbon radical having from 8 to 36 carbon atoms, an aminoamide derived from a long-chain carboxylic acid and a polyfunctional amine, and an imidazoline compound.

8. A process as in claim 1 wherein said amine compound contains at least one long-chain hydrocarbon radical containing from about 8 to about 36 carbon atoms which is mono- or polyolefinically unsaturated.

9. A process as in claim 1 wherein said basic amine compound is added to said mud in an amount of up to about ten pounds per barrel of said mud.

10. A process as in claim 1 wherein said mud contains an ester oil of a monofunctional alcohol and a monofunctional carboxylic acid.

11. A process as in claim 1 wherein said ester oil comprises a monocarboxylic acid ester of a $C_{2-12}$ monofunctional alcohol wherein the monocarboxylic acid contains from 16 to 24 carbon atoms and is olefinically mono- or poly-unsaturated.

12. A process as in claim 1 wherein said ester oil comprises a monocarboxylic acid ester of a $C_2$–$C_{12}$ monofunctional alcohol wherein the monocarboxylic acid contains from 12 to 16 carbon atoms and is aliphatically saturated.

13. The process of regenerating a viscous water-in-oil invert drilling mud and improving the flowability of said mud, said mud containing an ester oil in a continuous oil phase together with a disperse aqueous phase, an emulsifier, weighting agent, and fluid loss additive, comprising adding to said mud a basic amine compound having an oleophilic character and a limited solubility in water, and forming an oil-soluble salt with said amine compound and a carboxylic acid formed by hydrolysis of said ester oil.

14. A water-in-oil drilling mud which is suitable for the development of oil and gas sources, said mud consisting essentially of an ester oil in a continuous oil phase together with a disperse aqueous phase, an emulsifier, weighting agent and fluid loss additive, and a basic amine compound having an oleophilic character and a limited solubility in water, wherein said amine compound is capable of forming an oil-soluble salt with a carboxylic acid formed by hydrolysis of said ester oil and serves as an additive for improving the flowability of said mud and for protecting said mud against unwanted thickening during use.

15. A drilling mud as in claim 14 wherein said amine compound has a solubility in water at room temperature of less than about 5% by weight.

16. A drilling mud as in claim 14 wherein said amine compound is selected from the group consisting of a substantially water-insoluble primary, secondary and tertiary amine, a basic amine compound containing at least one long-chain hydrocarbon radical having from 8 to 36 carbon atoms, an aminoamide derived from a long-chain carboxylic acid and a polyfunctional amine, and an imidazoline compound.

17. A drilling mud as in claim 14 wherein said amine compound contains at least one long-chain hydrocarbon radical containing from about 8 to about 36 carbon atoms which is mono- or polyolefinically unsaturated.

18. A drilling mud as in claim 14 wherein said basic amine compound is present in said mud in an amount of up to about ten pounds per barrel of said mud.

19. A drilling mud as in claim 14 wherein said ester oil comprises an ester of a monofunctional alcohol and a monofunctional carboxylic acid.

20. A drilling mud as in claim 14 wherein said amine compound also serves as an alkali reserve component of said mud.

21. A drilling mud as in claim 20 containing a substance other than said amine compound to provide an alkali reserve to said mud.

22. A drilling mud as in claim 14 containing lime.

23. A drilling mud as in claim 14 wherein said ester oil comprises a monocarboxylic acid ester of a $C_2$–$C_{12}$ monofunctional alcohol wherein the monocarboxylic acid contains from 16 to 24 carbon atoms and is olefinically mono- or poly-unsaturated.

24. A drilling mud as in claim 14 wherein said ester oil comprises a monocarboxylic acid ester of a $C_2$–$C_{12}$ monofunctional alcohol wherein the monocarboxylic acid contains from 12 to 16 carbon atoms and is aliphatically saturated.

25. A drilling mud as in claim 14 wherein said amine compound is selected from an olefinically unsaturated aliphatic, cycloaliphatic and heterocyclic oleophilic basic amine containing one or more N groups.

* * * * *

Disclaimer 5,254,531—Heinz Mueller, Monheim; Claus-Peter Herold, Mettmann; Stephan von Tapavicza, Erkrath, all of Fed. Rep. of Germany. OLEOPHILIC BASIC AMINE COMPOUNDS AS AN ADDITIVE FOR INVERT DRILLING MUDS. Patent dated October 19, 1993. Disclaimer filed July 17, 1997, by the assignee, Henkel KGaA and Baroid Limited.

The term of this patent shall not extend beyond the expiration date of Pat. No. 5,348,938 and 5,318,954.

*(Official Gazette,* December 9, 1997)

UNITED STATES PATENT AND TRADEMARK OFFICE
Certificate

Patent No. 5,254,531                                                          Patented: October 19, 1993

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Heinz Mueller, Monheim, Germany; Claus-Peter Herold, Mettmann, Germany; Stephan von Tapavicza, Erkrath, Germany; and Douglas J. Grimes, Stonehaven, Scotland.

Signed and Sealed this Twenty-fourth Day of June 2003.

<div align="right">
JAMES O. WILSON<br>
<i>Supervisory Patent Examiner</i><br>
Art Unit 1623
</div>